United States Patent
Pickens et al.

(10) Patent No.: US 6,298,871 B1
(45) Date of Patent: Oct. 9, 2001

(54) CHEMICAL FEEDER

(75) Inventors: Stanley R. Pickens, Monroeville, PA (US); Richard H. Ferguson, New Martinsville, WV (US)

(73) Assignee: PPG Industries Ohio, inc., Cleveland, OH (US)

(*) Notice: Subject to any disclaimer, the term of this patent is extended or adjusted under 35 U.S.C. 154(b) by 0 days.

(21) Appl. No.: 09/738,179

(22) Filed: Dec. 15, 2000

(51) Int. Cl.[7] .................................................. B01D 11/02
(52) U.S. Cl. ...................... 137/268; 422/264; 422/275; 422/277
(58) Field of Search ................... 137/268; 422/261, 422/264, 275, 276, 277

(56) References Cited

U.S. PATENT DOCUMENTS

| | | |
|---|---|---|
| 3,107,156 | 10/1963 | Fredericks . |
| 3,474,817 | 10/1969 | Bates et al. . |
| 3,595,395 | 7/1971 | Lorenzen . |
| 3,595,786 | 7/1971 | Horvath et al. . |
| 3,598,536 | 8/1971 | Christensen . |
| 3,864,090 | 2/1975 | Richards . |
| 3,899,425 | 8/1975 | Lewis . |
| 4,210,624 | 7/1980 | Price . |
| 4,331,174 | 5/1982 | King, Sr. . |
| 4,379,125 | 4/1983 | Benninger et al. . |
| 4,584,106 | 4/1986 | Held . |
| 4,732,689 | 3/1988 | Harvey et al. . |
| 4,759,907 | 7/1988 | Kawolics et al. . |
| 4,790,981 | 12/1988 | Mayer et al. . |
| 4,842,729 | 6/1989 | Buchan . |
| 4,917,868 | 4/1990 | Alexander et al. . |
| 5,089,127 | 2/1992 | Junker et al. . |
| 5,384,102 | 1/1995 | Ferguson et al. . |
| 5,427,748 | 6/1995 | Wiedrich et al. . |
| 5,441,711 | 8/1995 | Drewery et al. . |
| 5,447,641 | 9/1995 | Wittig . |
| 5,932,093 | 8/1999 | Chulick . |
| 6,077,484 | 6/2000 | Graves . |
| 6,183,631 * | 2/2001 | Cormier et al. ................. 137/268 X |

* cited by examiner

Primary Examiner—Kevin Lee
(74) Attorney, Agent, or Firm—Dennis G. Millman

(57) ABSTRACT

A chemical feeder that produces a solution of a chemical treating agent, e.g., calcium hypochlorite, is described. The chemical feeder comprises a housing (22) having a base (36), side wall (20) extending upwardly from the base, and a closed upper end (28), all of which define a cavity (2). An elongated substantially vertical hollow container (10) is centrally located within the cavity. The bottom of the side wall (12) of the container is adjacent to the base, and contains a plurality of perforations 14 in the lower portion of the side wall, which is spaced from the inside side wall of the housing. At least one hollow canister (40) having a plurality of perforations (47, 49) in its base and the lower portion of its side wall is interposed, e.g., slidably received, within the container. Conduits for delivering liquid (32) in which the chemical treating agent is soluble to a chamber (5) below the perforations in the canister and for removing a liquid stream (30) containing the chemical treating agent from the feeder are also provided.

38 Claims, 4 Drawing Sheets

CHEMICAL FEEDER

DESCRIPTION OF THE INVENTION

The present invention is directed generally to chemical feeders. In particular, the present invention is directed to automatic chemical feeders useful for preparing a liquid solution, e.g., an aqueous solution, of a chemical material such as a sanitizing chemical, and dispensing such solution at or to a location, e g., a body of water, where it is to be used. More particularly, the present invention is directed to a chemical feeder that automatically dispenses controlled amounts of an aqueous solution of a chemical material, e.g., a sanitizing chemical such as calcium hypochlorite, in a reliable, efficient and cost effective manner for treatment of water systems, e.g., water treatment plants, potable water supplies, water for industrial or process usage, waste water systems, water systems for cooling towers, run-off water, swimming pools, hot tubs and the like. Still more particularly, the present invention is directed to a chemical feeder, which has improved flexibility in the delivery rate of dissolved chemical material.

Chemical feeders for producing aqueous solutions of water treating agents are known. Aqueous fluids containing sanitizing agents produced by such feeders have been utilized to disinfect effluent from sewage treatment plants, and for the chlorination of water in swimming pools and hot tubs. Such feeders have been used also for the dissolution and delivery of other water-soluble chemicals to aqueous streams and water systems. Chemical feeders designed to disinfect effluent from sewage treatment plants have been designed to overcome the drawbacks of previous chlorine treatment systems, which required extensive daily attention by operators in order to achieve acceptable treatment of the sewage plant effluent.

Chlorine and other sanitizing chemicals are used in swimming pool and hot tub applications to control the growth of algae and other organisms in the water. The concentration of the sanitizing chemical in a body of water, e.g., a swimming pool, must be kept between the concentration level that is effective to eliminate algae and other objectionable organisms and below a higher concentration level that is harmful to the user. Consequently, chemical feeders which produce aqueous solutions of sanitizing agents that are used in the treatment of recreational water for bathing, swimming and hot tubs, have been designed to alleviate the shortcomings that typically accompany periodic manual additions of sanitizing agents, i.e., a wide variation in the amount of sanitizing agent added. Examples of chemical feeders for treating aqueous streams and/or bodies of water, e.g., sewage effluent, pools and hot tubs, are described in U.S. Pat. Nos. 3,595,786; 3,595,395; 4,584,106; 4,732,689; 4,759,907; 4,842,729; 5,089,127; 5,427,748; 5,441,711; 5,447,641; 5,932,093; and 6,077,484.

A feature associated with earlier chemical feeder designs is that the variation in chemical material concentrations produced is a direct function of the flow rate of dissolving liquid contacting the chemical material within the feeder, i.e., the higher the flow rate—the higher the chemical material concentration in the dissolving liquid. For example, the introduction of water at a given flow rate into a calcium hypochlorite feeder exemplified by U.S. Pat. No. 5,089,127, produces an aqueous effluent with a given concentration of calcium hypochlorite. Increasing the flow rate of water into the feeder causes more water-solid calcium hypochlorite interaction and/or faster dissolution of the calcium hypochlorite, thereby producing an aqueous effluent with a nearly constant concentration of calcium hypochlorite. In such feeders, the delivery rate of chemical material, e.g., calcium hypochlorite, with increasing flow rate of dissolving liquid, e.g., water, approximates a straight line function. A drawback of such feeders is that the delivery rate of chemical material is too invariant with changes in flow of dissolving liquid.

It would be desirable to develop a new and useful chemical feeder in which the concentration of chemical material product delivered by the feeder was more variable with increasing flow rates of water (or other dissolving liquid) into the feeder, i.e., the delivery rate of chemical material with increasing flow of dissolving liquid is not a straight line function but approximates a parabolic function. Such a feeder would possess a greater turn down variability in the delivery of chemical material as the flow rate is reduced. It would also be particularly desirable that such a new chemical feeder be easy to use, e.g., easy to recharge with chemical treating agent and safe to operate.

In accordance with the present invention, there is provided a chemical feeder comprising:

(a) a housing having a base, side walls extending upwardly from said base and a closed upper end, said base and side walls defining a cavity;

(b) an elongated substantially vertical hollow container within said cavity, said container having side walls, the bottom of which are adjacent to said base and which are spaced from the side walls of the housing, thereby defining a collection zone, which is further defined by the outside walls of the container and the inside walls of the housing (including the closed upper end), the side walls of the container extending through and above the closed upper end of the housing and having a plurality of perforations arrayed around its lower portion; thereby to provide liquid communication between the inside of the container and the collection zone;

(c) at least one canister having a base and side walls for retaining solid chemical material therein, said canister having a plurality of perforations in its lower portion, said perforations in the canister being such as to expose only the lower portion of solid chemical material contained therein, said canister being interposed within the container such that the base of the canister is juxtaposed to or below the top of the uppermost perforations arrayed around the lower portion of the side wall of the container, the base of the canister, the base of the housing and the lower portion of the side walls of the container below the canister base defining a chamber;

(d) means to deliver liquid in which the solid chemical material is soluble to the chamber; and (e) means for removing liquid containing said chemical material from the collection zone.

In another embodiment of the present invention, the inlet for supplying liquid to the chamber is positioned in the side wall of the container in such a manner as to provide a tangential, cyclonic flow of liquid within the chamber. In a further embodiment of the present invention the canister and the lid for the container are attached to form a single integrated member or unit.

The features that characterize the present invention are pointed out with particularity in the claims, which are annexed to and form an integral part of this disclosure. These and other features of the invention, its operating advantages and the specific objects obtained by its use will be more fully understood from the following detailed description and the accompanying drawings in which preferred embodiments of the invention are illustrated and described, and in which like reference characters designate corresponding parts.

Other than in the operating examples, or where otherwise indicated, all numbers and values, such as those expressing the dimensions of the feeder and flow rates, used in the specification and claims are to be understood as modified in all instances by the term "about."

DETAILED DESCRIPTION OF THE INVENTION

Figure 1:
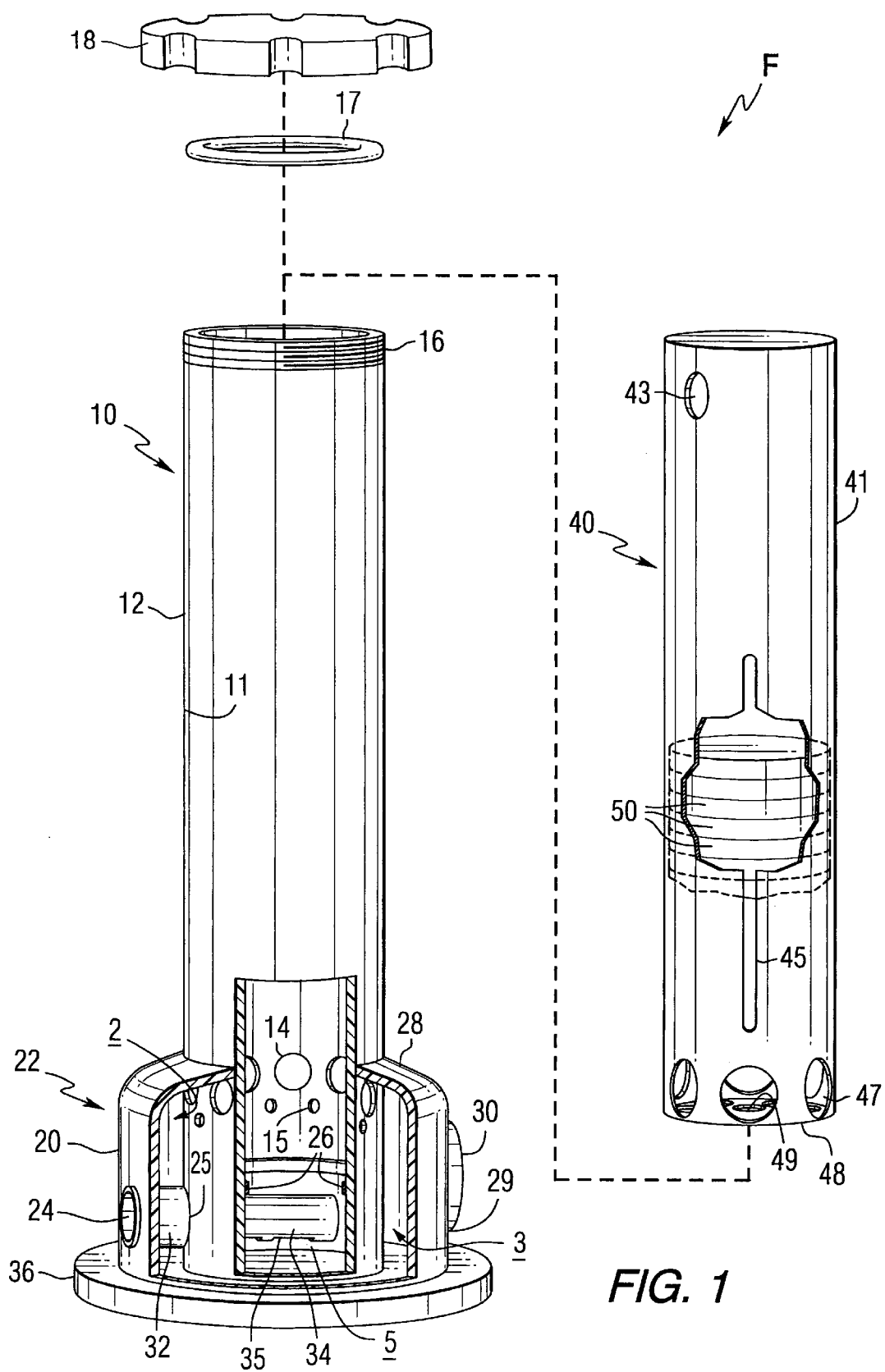
FIG. 1 is a partially exploded, partially cut away perspective view of a chemical feeder, including a canister which is inserted within the feeder, according to the present invention.

An embodiment of a chemical feeder according to the present invention is illustrated in FIG. 1. Referring now to FIG. 1, there is shown feeder F, which includes a housing 22 having a base 36, side wall 20 extending upwardly from said base, and a closed upper end 28, all of which together define a cavity 2. Base 36, as shown, is circular in shape and larger than the area enclosed by the side walls of the housing, i.e., the perimeter of the base is larger than the perimeter of the side wall 20 of the housing. Alternatively, base 36 may have the same dimension as the perimeter of the housing side wall. Moreover, the base may have a shape other than circular, e.g., elliptical, square, rectangular, etc. Preferably, the base is circular and larger than the perimeter of the side wall of the housing to provide stability to the feeder when placed in an upright and standing position.

Housing 22, as shown, is in the form of an inverted cup, wherein the lower portion of the side wall 20 is in the shape of a short cylinder and the upper section of the side walls are bent, i.e., arched, toward and attached to the side wall 12 of container 10, e.g., by cementing, thermal welding, etc., thereby to form the closed upper end 28 of the housing. Alternatively, the closed upper end 28 of the housing may be fabricated with a flat circular plate flange having a center hole, the diameter of which is the same as the outside diameter of container 10, which plate is affixed in any conventional way to the top of vertical side wall 20 of housing 22 and to the outside of side wall 12 of container 10. Additionally, the closed upper end 28 of housing 22 may be in the shape of a truncated cone extending from the top of side wall 20 to the outside of side wall 12 of container 10. The shape and size of housing 22 (and the other components of the feeder) is not critical. It can be of any suitable size and shape to accommodate the specific implementation required for feeder F, e.g., the size of container 10 and the desired liquid flow rate capacity. For ease of fabrication, it is preferred that housing 22 be substantially cylindrical.

Housing 22, as shown, has a circular opening in the center of its upper end 28 that is the same diameter as the outside diameter of elongated, substantially vertical hollow container 10. For ease of fabrication, container 10 is formed from a hollow cylinder, i.e., in the form of a pipe that is open at both ends; however, container 10 may be of any suitable shape in which event the opening in the upper end of housing 22 will match the geometry of the container.

The bottom of side wall 12 of container 10 is adjacent to base 36 and may be attached to base 36 by any suitable means so as to provide a water (or dissolving liquid) tight seal and to form the perimeter of chamber 5, e.g., thermal welding, by use of an adhesive, embedding and cementing the side wall into a circular groove cut into the base member, etc. It is contemplated that cylinder 10 may be formed from a cylinder that is closed at the lower end so that the closed end rests on and is attached to base 36 by conventional attachment means. In that case, the lower end of side wall 12 as contemplated herein would also be considered as being adjacent to base 36. Side wall 12 of container 10 is spaced from side wall 20 of housing 22, thereby to define a collection zone 3, which is a part of cavity 2 and which surrounds the outside of the lower portion of container 10. The volume of collection zone 3 is defined by the inside of side wall 20 of housing 22, the outside of side wall 12 of container 10, and the inside surfaces of base 36 and the upper end 28 of housing 22 located between the aforedescribed side walls. The specific volume of collection zone 3 can be varied and will depend on the specific implementation of the feeder; namely, the size of the feeder required to accommodate the maximum volume of liquid to be handled by the feeder for its intended application. It is contemplated that the flow of liquid through feeder F over a 24 hour period may range from 30 gallons (113.6 liters) to 14,400 gallons (54,510 liters), e.g., an average of 3000 gallons (11,356 liters), i.e., 0.2 to 10 gallons/minute (0.75 to 37.85 liters/minute). The flow rate of liquid through the feeder can vary from the specific values described. For example, higher flow rates can be attained by increasing the size of inlet conduit 32, outlet conduit 30 and distribution pipe 34.

Side wall 12 of container 10 extends above the closed upper end 28 of housing 22 to a point remote from upper end 28, and contains a plurality of perforations 14 arrayed in the lower portion thereof, which lower portion is below the inside wall of upper end 28 of housing 22. As shown in FIG. 1, perforations 14 in side wall 12 are circular in shape and are arrayed with all of their centers in the same horizontal plane. In another contemplated embodiment, perforations 14 may be staggered in different planes, thereby to provide a group of perforations in several horizontal planes. While shown as circular, perforations 14 may be of any shape, but preferably are circular. The size of perforations 14 may vary, but should be selected so as to accommodate (in combination with perforations 15, if used) the peak volume of liquid flowing through the feeder, but not so large as to compromise the structural integrity of container 10. Perforations 14 (and 15, if used) allow liquid communication between the inside of container 10 and collection zone 3.

In a further contemplated and preferred embodiment, side wall 12 contains an additional group of perforations 15 which are arrayed below perforations 14. As noted with respect to perforations 14, perforations 15 may be of a shape other than circular. In the embodiment depicted in FIG. 1, perforations 15 are circular in shape and smaller in size than perforations 14, although they do not have to be smaller in size. The total area of the openings provided by perforations 15 is smaller than the total area of the openings provided by perforations 14. Hence, the size and number of the perforations 14 and 15 are determined to satisfy this requirement. While the ratio of the area of the openings of perforations 14 to that of perforations 15 may vary, such ratio is greater than 1:1. In contemplated embodiments, the ratio is greater than 2:1; e.g., from 4:1 to 16:1, particularly 8:1. The ratio can vary from any lower specified ratio to any higher specified ratio. The total area of the perforations 14 and 15 controls the dissolving liquid flow characteristics, i.e., the depth of liquid within container 10 and the permissible liquid flow rate.

Perforations 14 also may be arrayed in several horizontal planes or in one horizontal plane. In this embodiment, the plurality of perforations in the lower portion of the side wall of container 10 comprise a group of perforations in an upper section (in the lower portion of the side wall) and a group of perforations in a lower section (in the lower portion of the side wall), the perforations in the lower section being below the perforations in the upper section. As described, the perforations in the lower section provide a smaller total area than the total area of the perforations in the upper section. As depicted in FIG. 1, each individual perforation in the lower section is of the same size and shape as one another and is smaller than the individual perforations in the upper section, which are also of the same size and shape as one another.

Use of an upper section of perforations and a lower section of perforations allows the feeder to be operated with a greater turn down in the delivery rate of chemical material as the flow rate of dissolving liquid is reduced, i.e., a wider range of delivery rates as a result of changing liquid flow rate is obtained compared to feeders that do not have this feature. As will be explained subsequently, the feeder can be operated with a flow of liquid such that liquid entering the container and contacting exposed chemical material within the lower portion of the canister exits the container only through perforations in the lower section, which results in an aqueous product stream withdrawn from collection zone 3 that has a relatively low concentration of chemical material compared to a product stream produced at a higher liquid flow rate wherein the liquid exits the container through perforations in both the upper section and the lower section.

The rim at the top of cylinder 10 is threaded with external threads 16. Lid or cap 18 having internal threads (not shown) that match external threads 16 is threaded onto the top of cylinder 10 to close the upper end of hollow container 10. O-ring 17 of a diameter the same as that of container 10 at its upper end is located in an annular groove (not shown) within lid 18 so that when lid 18 is screwed onto container 10 and is in place, the lid compresses O-ring 17, thereby separating the inside of cylinder 10 from the outside environment. O-ring 17 may be fabricated from EPDM (ethylene propylene diene monomer), VITON® fluoroelastomer or other elastomers resistant to the chemical material retained in the canister. As shown, lid 18 is notched around its perimeter to allow for a tight grasp of the lid by the operator and to provide a means to promote easy turning of the lid; however, the side of lid 18 can be smooth or of any other conventional shape.

While lid 18 is shown as being attached to cylinder 10 by threaded attachment means, any suitable art-recognized removable attachment means, e.g., clamps, bolts, screws, latches, etc., may be used to maintain a sealed environment within the upper portion of container 10. Preferably, attachment means that facilitate the separation of the lid from the container, e.g., clamps or a threaded attachment, and which serve to insulate the inside of the container from the outside environment are used.

Figure 2:
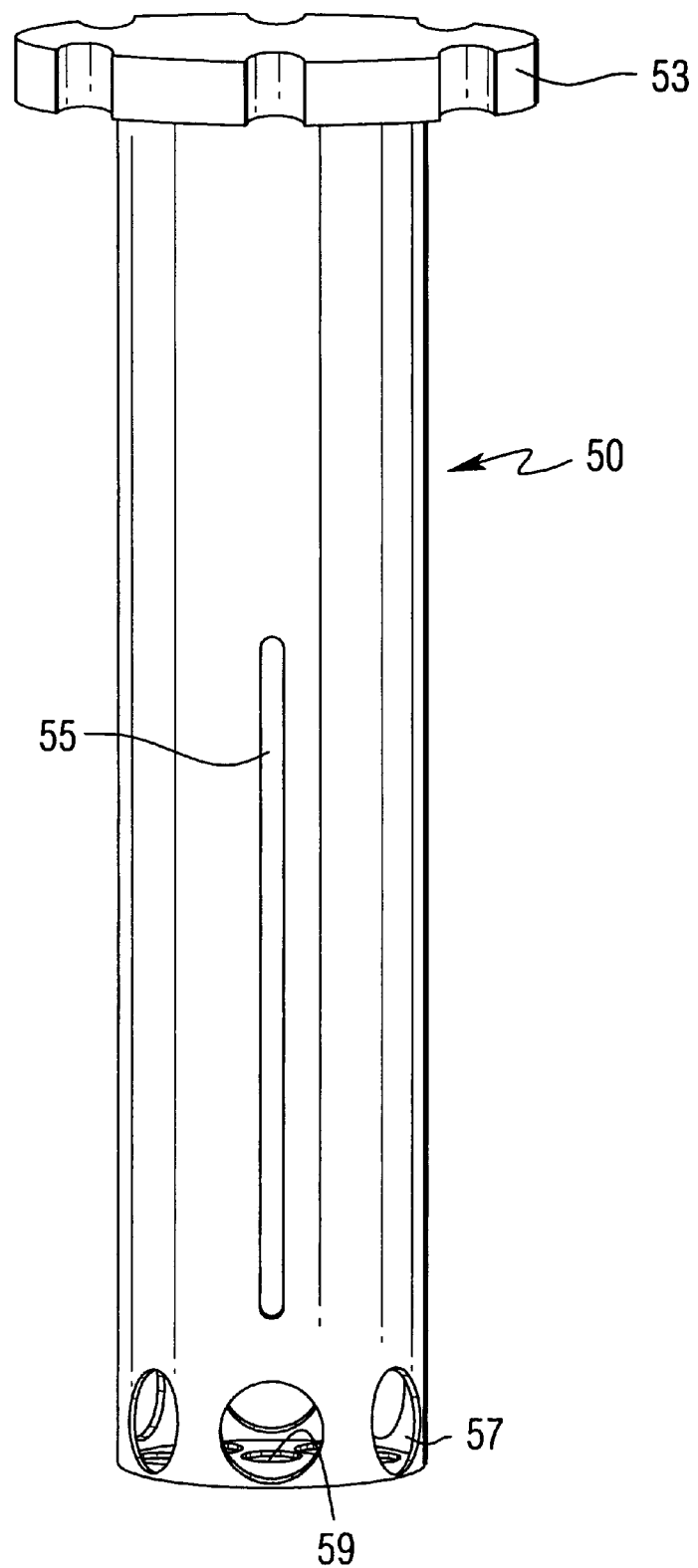
FIG. 2 is a perspective view of an integrated lid-canister member that may be used with the chemical feeder illustrated in FIG. 1.

Referring to FIG. 2, there is shown an embodiment wherein the lid 53 is attached to canister 50, which, like the canister of FIG. 1, has perforations 57 and 59 in the lower portion and base of the canister, and a vertical slot hole 55 in the side wall. Lid 53 may be attached to canister 50 by any suitable conventional attachment means, e.g., a threaded attachment, thermal welding, use of an adhesive, embedding the rim of the canister into a groove cut into the underside of the lid, etc. In this embodiment, where the lid is not removably attached to the canister, the canister is filled with chemical material before attaching the lid. Preferably, the lid is removably attached. As described with respect to FIG. 1, lid 53 can contain threads for attaching it to matching threads on the lip of container 10.

Referring further to FIG. 1, there is shown cylindrical hollow canister 40 for retaining solid chemical material therein. As illustrated, canister 40 has a base 48, side walls 41 and a plurality of perforations 47 and 49 in its lower portion. As shown, perforations 47 are arrayed around the lower end of side wall 41 and perforations 49 are arrayed in base 48 of the canister. Perforations 47 and 49 are of a shape and size so as to expose only the lowermost portion of the chemical material placed in the container. The number, size, shape and location of the perforations in the canister may vary, depending in part on the size of the canister, the liquid delivery rate and the chemical material concentration desired in the liquid withdrawn from feeder F. The size, shape and location of the perforations should not adversely affect the structural integrity of the canister. While the perforations are depicted as circular, they may be of any suitable geometric shape.

In one embodiment of the invention and the one illustrated in FIG. 1, canister 40 has a substantially constant diameter along its vertical length that is slightly smaller, e.g., 0.13 inches (0.33 cm.) smaller, than the inside diameter of container 10 so that canister 40 is slidably received within container 10 and spaced from the inside side wall 11 of container 10. When inserted into container 10, canister 40 is supported in place by a canister support ring 26 attached to the lower inside wall of container 10. Support ring 26 is preferably located below perforations 14 and 15 of container 10, but above distribution pipe 34. While a support ring is shown, canister 40 may be supported within container 10 by any suitable means, such as by a snap ring near the upper portion of the inside wall of container 10, or by other suitable removable attachment means.

In the embodiment shown in FIG. 1, canister 40 is of a length such that perforations 47 and 49 in the lower portion of the canister are located below perforations 14 and 15 of container 10. However, the bottom of canister 40 can be below, near the same level or even slightly above perforations 14 in container 10. Canister 40, as shown, has a length substantially the same as the useable length of container 10, i.e., from just below the rim at the top of container 10 to support ring 26; and is cylindrical in shape with a vertical axis coaxial with the vertical axis of container 10.

Base 48 of canister 40 may rest on support ring 26, as shown in FIG. 1, or it may be positioned at a level equal to or slightly above, e.g., juxtaposed to, the most upper portion of the uppermost perforations 15, or any level between the two. Positioning the level of base 48 of canister 40 at the desired location may be accomplished by conventional techniques known to those skilled in the art, which will depend on whether the position desired is to be permanent or temporary, i.e., a variable position. If the former, the support ring or other means of support, e.g., snap ring, can be located to provide the desired position. If the latter, other means known to those skilled in the art for varying the level of base 48 within the lower portion of container 10 can be used. For example, container 10 can be threaded internally at a point along its length (but above perforations 14) and canister 40 can be threaded with matching threads at a point along its length so that when canister 40 is inserted into container 10, the matching threads mesh and canister 40 can be moved vertically the length of the threads, usually a short distance, by turning the canister to position the base 48 at the desired level within the container.

In another embodiment, a series of vertically placed notched rings can be attached to the inside of container 10 and a matching lip attached to the outside of the canister so that the canister can be lowered or raised in a series of steps by turning the canister until the lip on the canister matches the notch in the ring.

Figure 3:
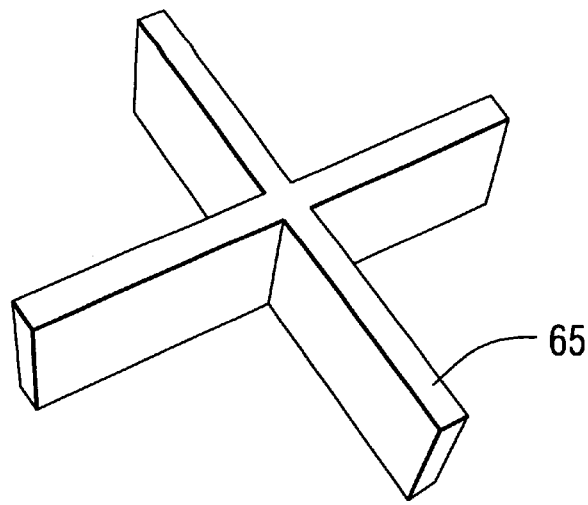
FIG. 3 is perspective view of a spacer member that may be used to elevate the canister within the container.

In a further contemplated embodiment, as shown in FIG. 3, cross member 65 may be placed on support ring 26 to raise the level of base 48 and support canister 40. Cross member 65 may be fabricated of any suitable material, such as the materials from which the feeder may be fabricated, as described in this description.

Figure 4:
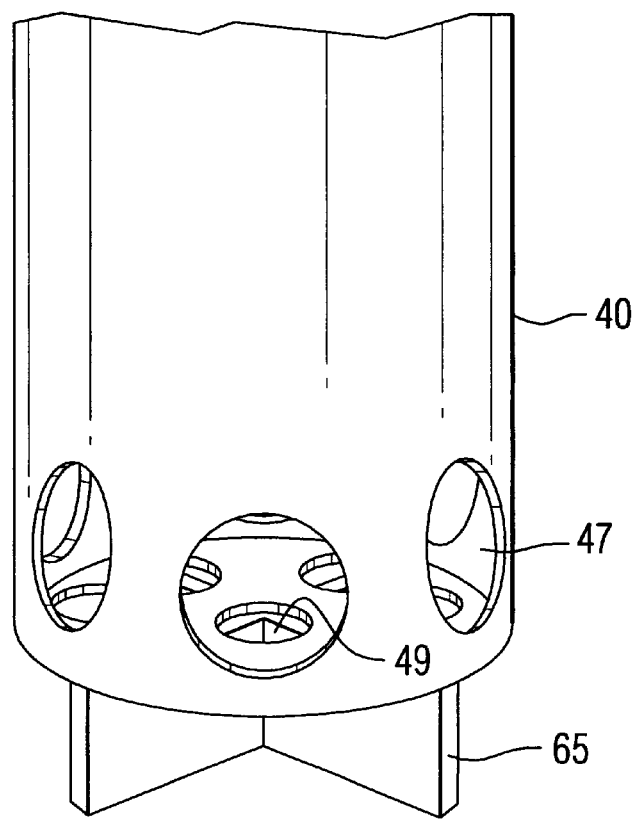
FIG. 4 is a perspective view of the spacer member of FIG. 3 and the lower section of the canister of FIG. 1 to illustrate the spatial relationship of the spacer member and the base of the canister.

Cross member 65 may be of any suitable design, e.g., a ring or screen with large openings, provided that it does not substantially obstruct the flow of liquid into canister 40 through perforations 49. Further, support member 65 may be attached permanently to base 48, as shown in FIG. 4. At low liquid flow rates and with the base 48 raised to approximately the level equal to a position that is aligned horizontally with the most upper section of the uppermost of perforations 15 and with liquid flowing out largely through perforations 15, the chemical material, e.g., tablets, within canister 40 is barely wetted by the dissolving liquid, thereby producing a product effluent with a very dilute concentration of chemical material. As the base of canister 48 is lowered from the aforedescribed position, more chemical material will be wetted, thereby producing a more concentrated product effluent. By varying both the position of the base 48 of canister 40 and the liquid flow rate, product effluent with a wide range of chemical material concentrations can be provided.

It is contemplated that base 48 can be positioned at a level slightly above the uppermost of the perforations 15. In such an embodiment, high flow rates will be required to flood the chamber 5 and reach the chemical material exposed through perforations 47 and 49 in the canister. An advantage of this embodiment (and embodiments using a high flow rate of dissolving liquid) is that less scale will develop on the surfaces of the feeder exposed to the solution of chemical material, e.g., calcium deposits from calcium hypochlorite. Another advantage, is that the concentration of the chemical material, e.g., calcium hypochlorite, in the effluent will be lower, which improves the effective turn down ratio.

Canister 40, as shown, has a finger hole 43 near its upper portion to allow the canister to be removed from the container when the chemical material retained therein is depleted. While one finger hole is shown, two holes 180 degrees apart, or multiple finger holes can be used. Further, while finger holes for removing the canister are shown, other removal means can be used, e.g., by use of an external reverse vise that is inserted into the canister and tightened to extend and compress the sides of the vise against the inside wall of the canister. The canister can then be removed by lifting on a handle attached to the vise.

Solid chemical material retained within the canister can be of any suitable shape and size provided that it is not a size that it falls out of the perforations 47 and 49 in canister 40 when the canister is being filled. Preferably, the solid chemical material is in the form of tablets 50 or small cylinders that will bridge perforations 47 and 49; more preferably, tablets of a diameter nearly the same as the inside diameter of the canister, but of a diameter that permits easy loading of the tablets into the canister are used.

In a preferred embodiment, container 10 is fabricated from a clear material so that during operation of the feeder, the operator can observe the outside of the canister, which is interposed within the container. In such an embodiment, it is useful for canister 40 to also have an elongated narrow vertical perforation, e.g., slot 45 in and through side wall 41 so that the feeder operator can observe the level of chemical material within the canister and determine when it is necessary to replenish the chemical material.

While FIG. 1 illustrates a single canister that is slidably received within container 10, it is also contemplated that container 10 may be of a larger size so as to accommodate more than one canister, e.g., two or more canisters. In such event, the canisters would not be of a diameter such that they would be slidably received within the container but would be of a size such that a multiple number (or bundle) of canisters, e.g., 2 to 4 canisters, would fit either individually or as a bundled unit within the container and be supported therein by means known to those skilled in the art, e.g., a support plate resting upon support means projecting from the side wall of container 10, such as a support ring or annular ridge or series of stops attached to the interior wall of container 10, or other art-recognized supporting means having canister receiving holes, each adapted to receive and support one canister.

An inlet opening 24 is located in and near the lower portion of side wall 20 of housing 22. A similar inlet opening 25 is located in and near the lower portion of side wall 12, preferably on the same horizontal level as and in line with opening 24. An inlet conduit 32 extends through the side wall 20 of housing 22 and inlet 25 of container 10 and is connected to inlet distribution pipe 34 within chamber 5. In a preferred embodiment, inlet conduit 32 and distribution pipe 34 can be a single conduit.

Inlet conduit 32 and inlet distribution pipe 34 are used to introduce liquid into chamber 5. Pipe 34 has a series of small holes or one or more slots 35 on the bottom to allow liquid to flow from the pipe toward the bottom of base 36. The end of pipe 34 may be open or closed, but is preferably open. Inlet conduit 32 can be connected to a source of liquid, e.g., a pressurized aqueous stream, in which the chemical material is soluble.

In another embodiment, the end of pipe 34 is closed and is attached to the inside wall 11 of container 10 within chamber 5. An inlet control valve (not shown) is mounted on inlet conduit 32 at a location outside housing 22 to regulate the flow of liquid entering chamber 5 within the feeder.

An outlet opening 29 is located in side wall 20 of housing 22, preferably at a location 180° from the inlet opening 24, although the location of both the inlet and outlet openings and their relation to each other is not critical. Outlet conduit 30 extends from outlet opening 29 for removal of the solution of chemical material from the collection zone 3. Outlet conduit 30 can be connected to a suitable conduit, e.g., piping means, hoses and pumping means known to those skilled in the art (not shown) through and by which the liquid stream containing dissolved chemical material may be transported to a remote location, e.g., a storage vessel or to the point of application or use, e.g., to a reservoir, swimming pool, hot tub, cooling tower, etc., by various piping and pumping means known to those skilled in the art. Inlet conduit 32 and outlet conduit 30 may be provided with threaded portions or other conventional connecting means, e.g., quick-release fittings to provide connections to associated conduits, pipes, hoses and pumps, as described above, for movement of the liquid to and from feeder F.

A small drain hole (not shown) may be placed in side wall 12 of container 10 below support ring 26 to allow liquid in the chamber below canister 40 to be drained into collection zone 3 when the feeder is not in operation. The draining of chamber 5 prevents continuing dissolution of chemical material by the liquid remaining in and in contact with the bottom of the canister so that when the feeder is started, liquid effluent containing a high concentration of chemical material is not delivered. Also, draining prevents the soaking of chemical material in the canister.

In an embodiment of the operation of chemical feeder F, as shown in FIG. 1, canister 40 is filled with tablets of solid chemical treating agent, e.g., calcium hypochlorite, and the canister is placed in container 10. Lid 18 is threaded onto container 16 and inlet conduit 32 connected to a source of liquid, e.g., water. The liquid is charged to inlet conduit 32 and inlet flow distribution pipe 34, which has openings facing base plate 36, thereby introducing liquid into chamber 5. The liquid introduced into chamber 5 rises within and above the chamber to contact the exposed lowermost tablet (s) within canister 40. The tablets are dissolved in the liquid, which rises within the space between canister 40 and container 10 and passes through perforations 14 and/or 15 into collection zone 3. A liquid solution of dissolved chemical treating agent is withdrawn from the feeder through outlet conduit 30 from whence it can be forwarded to a point of use, e.g., a swimming pool, through a suitable conduit, not shown.

Chemical feeder F and its various components may be fabricated from any suitable material or combination of materials that are chemically and corrosion resistant to the solid chemical treating agent used, examples of which include, but are not limited to, polyethylene, ABS (acrylonitrile-butadiene-styrene resin), fiberglass reinforced resins, polystyrene, polypropylene, poly(vinyl chloride) [PVC], chlorinated poly(vinyl chloride), copolymers of such materials or any other appropriate material(s) that is chemically resistant to the solid chemical being dispensed, e.g., a sanitizing agent such as calcium hypochlorite. Other materials such as stainless steel may also be used, but the use of such material would result in a substantial increase in cost. In a preferred embodiment, the feeder is fabricated from poly(vinyl chloride) (PVC), which is generally chemically resistant to water sanitizing chemicals, such as calcium hypochlorite. In a more preferred embodiment, the container is fabricated from clear PVC, e.g., type 1, grade 1, cell class 12454, and the canister is fabricated from polypropylene, e.g., Profax®7823 resin, the remainder of the feeder being fabricated from PVC. Plastic parts of the feeder may be fabricated by art-recognized methods including, for example, injection or rotation molding.

When constructed of plastic resin material, the various parts of the feeder may be joined together by solvent welding, thermal welding, cementing, e.g., by use of PVC cement or other suitable adhesive, or by threading. The inlet and outlet conduits may also be joined to the feeder by the use of conventional bulkhead fittings (tank adapters). If a metal, such as stainless steel is used, conventional welding of the parts may be used to fabricate the feeder. Alternatively, the various parts of the feeder may be joined by conventional threaded bolts and appropriate gasketing to insure that the feeder is sealed, e.g., water-tight.

The solid chemical material, or treating agent, used with the chemical feeder of the present invention may be any chemical that is solid at ambient, i.e., standard, conditions of temperature and pressure (STP), which may be formed into large pellets, cylinders or tablets, and which is readily soluble in a flowing liquid, e.g., water, at STP conditions. Examples of such chemicals are sanitizing agents, e.g., chemicals that sanitize water, such as for example, calcium hypochlorite, bromo-chloro hydantoin, dichlorohydantoin and chlorinated isocyanurates; dechlorination agents such as sodium sulfite, sodium metabisulfite, sodium bisulfite, sodium thiosulfate, sodium hydrosulfide (NaSH), and sodium sulfide ($Na_2S$); and pH control agents such as sodium bisulfate, citric acid, sodium carbonate, sodium bicarbonate and quaternary ammonium compounds, some of which may be used also as algaecides.

It will be readily appreciated by those skilled in the art that the feeder of the present invention can be integrated into liquid, e.g., water, treatment facilities by appropriate piping connected with inlet conduit 32 and outlet conduit 30. The chemical feeder may be integrated into, for example: a single pass system, e.g., an aqueous stream used to sanitize the surface of an article, e.g., vegetables such as potatoes; or a closed loop system, e.g., a swimming pool. In one embodiment, inlet conduit 32 is connected to a by-pass line off of a main liquid, e.g., water, conduit by appropriate additional conduits, thereby providing a source of liquid for treatment. The liquid solution containing chemical treating agent removed through outlet conduit 30 is forwarded through appropriate conduits and introduced back into the main liquid conduit at a convenient point. In another embodiment, if the fluid flow in the main liquid conduit can be handled directly by the feeder, the feeder may be connected directly, i.e., in-line, with the main liquid conduit.

It will be further apparent to those of ordinary skill in the art that various changes may be made to the present invention without departing from the spirit and scope thereof. For example, it is anticipated that the lid 18 and gasket 17 arrangement can be replaced with other types of known connections for sealingly engaging a lid onto a cylinder. Additionally, the location of the inlet and outlet connections to the chemical feeder may be varied. It should be understood that the described specific embodiments of the invention demonstrate only certain preferred embodiments and that a variety of alternatives to those embodiments may be made to the feeder without significantly affecting the operation thereof.

The present invention is more particularly described in the following examples, which are intended to be illustrative only, since numerous modifications and variations therein will be apparent to those skilled in the art. Unless otherwise specified, all parts and percentages are by weight.

EXAMPLE 1

The feeder described in connection with FIG. 1 was constructed in the following manner. Base (36) was prepared from a 9-inch (22.9 centimeter [cm.]) diameter circle of 0.5-inch (1.3 cm.) thick polyvinyl chloride (PVC) sheet. Housing (22) was fabricated from a 6-inch (15.2 cm.) schedule 40 PVC pipe cap having a 4.625-inch (11.7 cm.) diameter hole cut in the end. Inlet (24) and outlet (29) were coaxial with each other, with centers 1.72-inches (4.4 cm.) from the lower end of housing (22). The fitting for the inlet (24) was a ¾-inch (1.9 cm.) schedule 40 PVC female pipe adapter. The fitting for the outlet (29) was made from one end of a 1½-inch (3.8 cm.) female pipe coupling. Both the inlet and the outlet fittings were thermally welded in place with a PVC welding rod. The lower end of the wall (20) of housing (22) was inserted into a groove about 0.25-inch (0.6 cm.) deep routed into the base and cemented in place with PVC cement.

Container (10) was made from a 25.455-inch (64.6 cm.) length of transparent 4-inch (10.2 cm.) schedule 40 PVC pipe, the bottom of which was inserted into a groove (concentric with the groove for the housing) about 0.25-inch (0.6 cm.) deep routed into the base and cemented in place with PVC cement. The outside side wall (12) of container (10) was joined to the shoulder (28) of housing (22) by means of a thermal weld with a PVC welding rod. Centered 4 inches (10.2 cm.) above the lower end of the container pipe was a circle of twelve 0.75-inch (1.9 cm.) diameter holes (perforations 14) evenly spaced at 30° intervals around the circumference of the pipe. Centered on a level 3.33 inches (8.5 cm.) above the lower end of the container pipe was a ring of six 0.375-inch (0.9 cm.) diameter holes (perforations 15) evenly placed around the pipe at 60° intervals. A groove for canister support ring 26 measuring 0.4 inches (1.0 cm.) wide by 0.06 inches (0.2 cm.) deep was cut into the inside surface of container wall (12) 2.875 inches (7.3 cm.) to 3.275 inches (8.3 cm.) from the bottom of the container. Support ring 26 was fabricated from a 0.375-inch (0.9 cm.) length of 4-inch (10.2 cm.) PVC pipe. A 96° segment (or about 1.2 inches [3.0 cm.]) was removed to form a "C" shaped piece, which was placed in the groove that had been cut for it. A 0.125-inch (0.3 cm.) diameter drain hole was drilled in the side wall (12) of the container 2.5 inches (6.4 cm.) from the bottom.

Canister (40) was fabricated from a 21.5-inch (54.6 cm.) length of 3.75-inch (9.5 cm.) O.D. polypropylene tubing. A ring of six 1.25-inch (3.2 cm.) diameter holes was centered 0.875 inches (2.2 cm.) from the lower end of the canister. These perforations were evenly spaced at 60° intervals around the pipe circumference. The bottom (48) of canister (40) was a 0.125-inch (0.3 cm.) thick circle of polypropylene sheet welded inside the lower end of the canister. The bottom of the canister had seven holes-each 0.75-inch (1.9 cm.) in diameter. One hole was in the center of the base, and the other six were hexagonally arrayed around the center hole equidistant from each other and from the center hole.

Inlet conduit (32) and distribution pipe (34) was made from a 4.5 inch (11.4 cm.) length of ¾-inch (1.9 cm.) schedule 40 PVC pipe, which was inserted and cemented into the slip portion of inlet (24) in the side of the housing and inlet hole (25) in the side of the container. The lower side of the portion of the inlet conduit within the container had two 0.25-inch (0.6 cm.) wide by 1.375-inch (3.5 cm.) long slots. The slots were collinear with each other. One slot ran from 0.25 inches (0.6 cm.) to 1.625 inches (4.1 cm.) from the end of the conduit farthest from the inlet. The other groove stared 0.25 inches (0.6 cm.) from the first and continued 1.375 inches (3.5 cm.) further toward the inlet. The end of the inlet conduit within the container was open.

Canister (40) was filled with PPG Accu-Tab™ white industrial 3-inch (7.6 cm.) calcium hypochlorite tablets and placed in container (10) with the bottom of the canister resting on support ring 26. The feeder was connected with suitable piping to a water source via a flow meter and control valve. The water used was at 20° Celsius and was chlorine-demand free. The flow of water was controlled via the control valve at the inlet. Water flow was controlled from 0 to 10 gallons (37.9 liters) per minute. Water from the outlet was allowed to drain by gravity into a surge tank. Water samples were collected from the outlet and from a pipe "T" and valve in the supply line so that both the source water and the effluent from the feeder could be analyzed for available chlorine.

Figure 5:
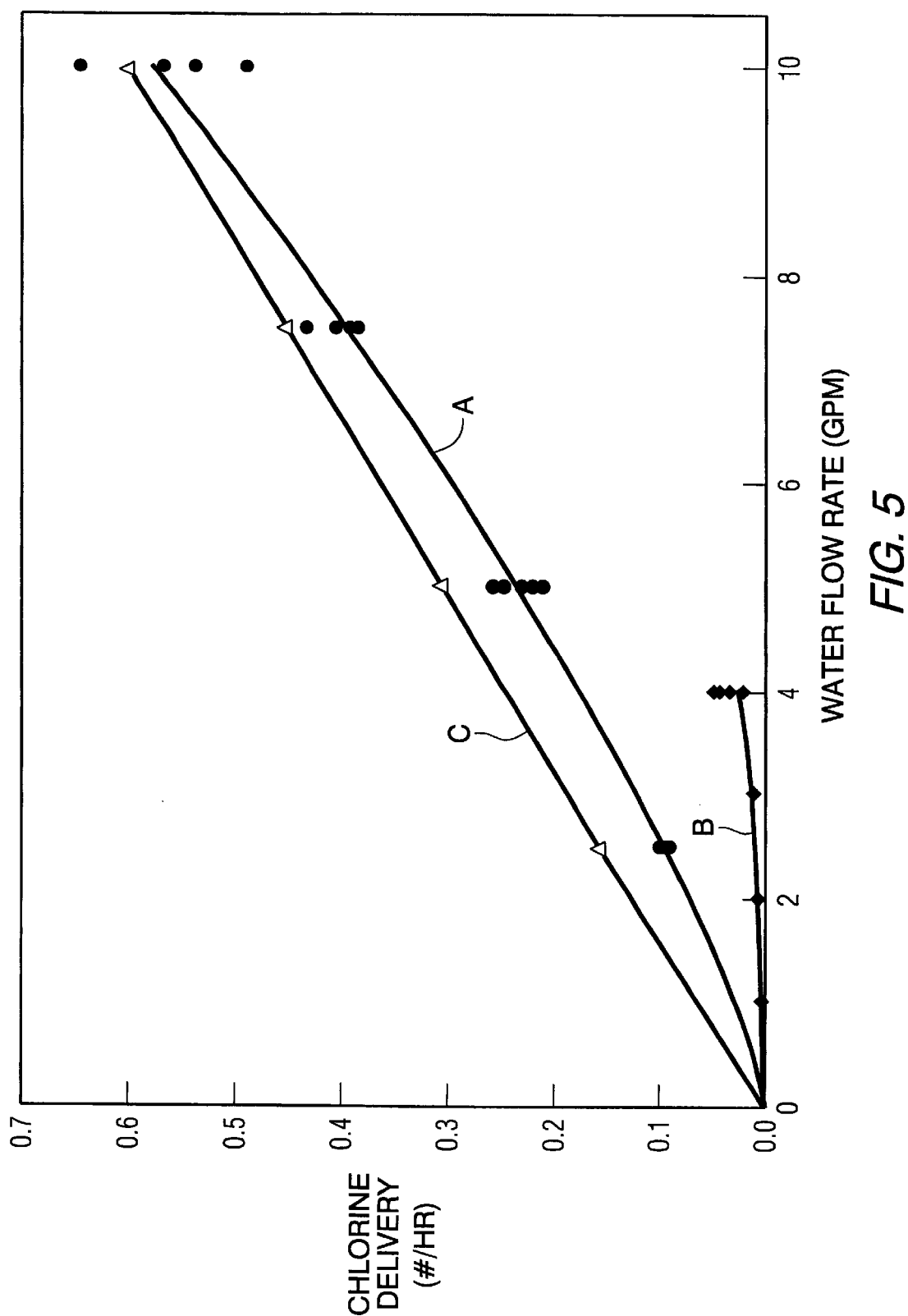
FIG. 5 is a graph of chlorine delivery rates in pounds/hour versus water flow rate in gallons per minute delivered to the chemical feeder for the feeder of FIG. 1 with and without the spacer member of FIG. 3.

Chlorine analysis was performed by iodometric titration with standardized thiosulfate. Samples were taken over the course of a few hours and titrated to measure delivered chlorine. (The source water always contained some chlorine to insure that it was chlorine demand free.) The data used for each given flow rate were collected after the feeder delivery rate had stabilized at the given flow rate. Results are depicted in FIG. 5 by the curve identified by the letter "A". A few flow rates were used to define the shape of the curve by a least squares fit.

EXAMPLE 2

A feeder of the design described in Example 1 was used except that it was fitted with a spacer of the type shown in FIG. 3 to elevate the canister above the support ring. The spacer (65) was a three-dimensional "X" made from two rectangles of 0.25-inch (0.6 cm.) thick PVC sheet. Each rectangle was 4 inches (10.2 cm.) long by 0.75 inches (1.9 cm.) wide and had a 0.25-inch (0.6 cm.) by 0.375-inch (0.9 cm.) slot extending from the middle of one 4-inch (10.2 cm.) side of the rectangle, halfway across toward the other 4-inch (10.2 cm.) side. The rectangles were oriented in perpendicular planes with the slots facing each other. The rectangles were slid together, each passing into the slot in the other to form the "X". The two sections of the spacer were held together with PVC cement. Spacer (65) was placed in container (10) and allowed to rest on canister support (26). Canister 40 was inserted into the container and allowed to rest on top of the spacer with the effect that the canister was 0.75 inches (1.9 cm.) higher in the container than in Example 1. The feeder was operated in the same manner as that described with respect to the feeder of Example 1, except that the flow of water was limited to a maximum of 4 gallons (15.7 liters) per minute because the arrangement with the spacer is designed for lower flow rates of water. Results are shown in FIG. 5 as the curve identified with the letter "B".

EXAMPLE 3

A feeder similar to that described in Example 1, but slightly shorter, was fabricated except that the container member did not have two rows of perforations. Instead, there was a single continuous opening 0.75 inches (1.9 cm.) in height forming a circle around the side wall and dividing it into two separate sections, the lower of which was 3.95 inches (10 cm.) high. The lower end of the upper section was 0.75 inches (1.9 cm.) above the top end of the lower section-about where the upper portion of the housing met the side wall of the container. The upper section of the container was welded on the outside to the shoulder of the six inch (15.2 cm.) pipe cap, and the lower section of the container was cemented into the groove in the base (36).

The canister for this feeder was similar to that described in Example 1, but was rotomolded rather than welded together from sheet and tubing. Also, the holes in the side of the canister were rectangular (1 inch wide×1.3 inches high) [2.5 cm wide×3.3 cm high] rather than being round. However, the open area of the rectangular openings was about the same as the round openings in the canister described in Example 1.

The feeder of this Example was operated in the same manner as described with respect to the feeder of Example 1. Results are shown in FIG. 5 as the curve identified with the letter "C".

The results depicted in FIG. 5 show that the feeder of Example 1 (curve A) allows for more controlled variation in the chlorine delivery rate. At maximum flow (10 gallons/minute) [37.9 liters/minute], the chlorine delivery rate is nearly the same as for the feeder of Example 3 (curve C). However, at very low flow rates, the chlorine delivery rate of the feeder of Example 1 is substantially below that of the feeder of Example 3, thereby making it possible to finely control low chlorine delivery at the low end of the curve without much sacrifice in delivery at the upper end of the curve obtained at high flow rates. Curve B shows a substantially lower chlorine delivery rate, easily controlled by changing the flow rate, but less affected by minor fluctuations in flow rate.

The present invention has been described with reference to specific details of particular embodiments thereof. It is not intended that such details be regarded as limitations upon the scope of the invention except insofar as and to the extent that they are included in the accompanying claims.

We claim:

1. Apparatus for delivering a solution of solid chemical material, comprising:
   (a) a housing having a base, side walls extending upwardly from said base and a closed upper end, said base and side walls defining a cavity;
   (b) an elongated substantially vertical hollow container within said cavity, said container having side walls, the bottom of which are adjacent to the base of said housing and which are spaced from the side walls of the housing, thereby defining a collection zone defined by the base of the housing, the outside walls of the container, the inside side walls of the housing and the closed upper end of the housing, the side walls of the container extending through and above the closed upper end of the housing, and having a plurality of perforations arrayed in its lower portion, thereby to provide liquid communication between the inside of the container and the collection zone;
   (c) at least one canister having a base and side walls for retaining solid chemical material therein, said canister having a plurality of perforations in its lower portion, said perforations in the canister being such as to expose only the lower portion of solid chemical material contained therein, said canister being interposed within the container such that the base of the canister is near the perforations in the lower portion of the container, the base of the canister, the base of the housing and a lower portion of the inside side walls of the container defining a chamber;
   (d) means to deliver liquid in which the solid chemical material is soluble to the chamber; and
   (e) means for removing liquid containing said chemical material from the collection zone.

2. The apparatus of claim 1 further comprising a removable lid on top of the container.

3. The apparatus of claim 1 wherein the housing is in the form of an inverted cup and the container is substantially cylindrical.

4. The apparatus of claim 3 wherein the canister interposed in the container is cylindrical.

5. The apparatus of claim 4 wherein a single canister is used, the canister being slidably received in said container and having a vertical axis coaxial with the container.

6. The apparatus of claim 5 wherein the canister rests on a support ring attached to the inside wall of the container below the perforations in the wall of the container.

7. The apparatus of claim 1 wherein the perforations in the lower portion of the canister are located in the base and side wall of the canister.

8. The apparatus of claim 7 wherein the canister has an elongated slot in the side wall.

9. The apparatus of claim 8 wherein the canister has at least one finger hole in the side wall of the upper portion of the canister.

10. The apparatus of claim 2 wherein the top of the canister is threaded to match threads on the lid.

11. The apparatus of claim 1 wherein the means for delivering liquid to the container comprises an inlet conduit in liquid communication with the chamber.

12. The apparatus of claim 11 wherein the inlet conduit extends to a location within the chamber and has slots located in the bottom of the conduit within the chamber through which liquid is discharged.

13. The apparatus of claim 12 wherein the end of the inlet conduit within the chamber is open.

14. The apparatus of claim 13 wherein the end of the inlet conduit is positioned so as to provide cyclonic flow of liquid within the chamber.

15. The apparatus of claim 12 wherein the end of the inlet conduit within the chamber is closed.

16. The apparatus of claim 1 wherein the solid chemical material to be dissolved is calcium hypochlorite.

17. The apparatus of claim 16 wherein the calcium hypochlorite is in the form of tablets having a diameter substantially the same as but less than the diameter of the canister.

18. The apparatus of claim 1 wherein the container is fabricated from a transparent material.

19. The apparatus of claim 18 wherein the transparent material is polyvinyl chloride.

20. The apparatus of claim 1 wherein each of the housing, container and canister are fabricated from a material selected from the group consisting of polyethylene, polypropylene, polyvinyl chloride and copolymers thereof.

21. The apparatus of claim 1 wherein the plurality of perforations in the lower portion of the side wall of the container comprise a group of perforations in an upper section, and a group of perforations in a lower section, each of said group of perforations being arrayed around the wall of the container, the perforations in the upper section being larger than the perforations in the lower section.

22. The apparatus of claim 21 wherein the perforations in the wall of the container are circular, and wherein there is one row of perforations in the upper section and one row of perforations in the lower section.

23. The apparatus of claim 1 wherein the base of the housing is larger than the area enclosed by the housing.

24. The apparatus of claim 1 wherein the canister is integral with a lid that can be mounted on the top of the container.

25. The apparatus of claim 24 wherein the lid screws onto the container.

26. Apparatus for delivering a solution of solid chemical material comprising:
   (a) a housing having a base, side walls extending upwardly from said base and a closed upper end, said base and side walls defining a cavity;
   (b) a substantially vertical hollow container within said cavity, said container having side walls, the bottom of which are affixed to the base of said housing and which are spaced from the side walls of the housing, thereby defining a collection zone defined by the base of the housing, the outside walls of the container and the inside side walls of the housing and the closed upper end of the housing, the side walls of the container extending vertically to a point above and remote from the closed upper end of the housing and having a plurality of perforations arrayed in its lower portion, thereby to provide liquid communication between the inside of the container and the collection zone;

(c) a substantially vertical hollow canister for retaining solid chemical material therein, said canister having a base and side walls and being located within the container, the base and lower side walls of the canister having a plurality of perforations, said perforations in the canister being such as to expose only the lower portion of solid chemical material contained therein, the base of the canister being located near the perforations in the side wall of the container, the base of the housing, the base of the canister and the lower portion of the inside side walls of the container defining a chamber;

(d) means to deliver liquid in which the solid chemical material is soluble to the chamber; and (e) means for removing liquid containing said chemical material from the collection zone.

27. The apparatus of claim 26 wherein the housing is in the shape of an inverted cup, and the container and the canister are substantially cylindrical.

28. The apparatus of claim 27 wherein the canister is slidably received within the container.

29. The apparatus of claim 28 wherein the chemical material is in the form of tablets of calcium hypochlorite, and liquid delivered to the chamber is an aqueous liquid.

30. The apparatus of claim 29 wherein the container is closed at the top by a lid.

31. The apparatus of claim 30 wherein the tablets are of substantially the same diameter as the canister.

32. The apparatus of claim 31 wherein the housing, container and canister are fabricated from a material selected from the group consisting of polypropylene, poly(vinyl chloride) and copolymers thereof.

33. The apparatus of claim 29 wherein the perforations in the side wall of the container are arrayed around the side wall in an upper section and a lower section, the area of the perforations in the upper section being larger than the area of the perforations in the lower section.

34. The apparatus of claim 33 wherein the ratio of the area of the perforations in the upper section to the area of the perforations in the lower section is greater than 1:1.

35. The apparatus of claim 34 wherein the ratio is from 4:1 to 16:1.

36. The apparatus of claim 33 wherein there is one row of perforations in the upper section and one row of smaller perforations in the lower section.

37. The apparatus of claim 32 wherein the wall of the container is transparent and the wall of the canister contains a vertical slot, thereby to show the level of tablets remaining in the canister.

38. The apparatus of claim 5 wherein the canister rests on a spacer that rests on a support ring attached to the inside wall of the container below the perforations in the wall of the container, the spacer having a dimension such that it raises the base of the canister to a level within a vertical dimension extending from a position below the perforations in the lower portion of the container to a position near the top of the perforations in the container.

* * * * *

UNITED STATES PATENT AND TRADEMARK OFFICE
CERTIFICATE OF CORRECTION

PATENT NO.     : 6,298,871 B1
DATED          : October 9, 2001
INVENTOR(S)    : Stanley R. Pickens et al.

It is certified that error appears in the above-identified patent and that said Letters Patent is hereby corrected as shown below:

Column 13,
Line 24, delete "a closed" and insert -- an --;
Line 30, after "thereby", insert -- said upper end of said housing joining the container sidewalls --";
Line 34, delete "closed";
Line 35, delete "closed";
Line 37, delete "its" and insert -- the --;
Line 37, after "portion" insert -- of the container side walls --;
Line 42, delete "its" and insert -- the --;
Line 42, after "portion", insert -- of the canister --.
Line 60, delete "a closed" and insert -- an --;
Line 65, after "thereby", insert -- said upper end of said housing joining the container sidewalls --;

Column 15,
Line 5, delete "its" and insert -- the --;
Line 5, after "portion", insert -- of the container said walls --.

Signed and Sealed this

Twenty-fourth Day of December, 2002

JAMES E. ROGAN
*Director of the United States Patent and Trademark Office*